(12) United States Patent
Deng et al.

(10) Patent No.: US 9,033,618 B2
(45) Date of Patent: May 19, 2015

(54) EFFECTIVE APPROACH TO PREVENTING AND REMEDYING DISTRESSES IN SOILS AND CONSTRUCTION MATERIALS

(75) Inventors: Yun Deng, Sugar Land, TX (US); Lianxiang Du, Austin, TX (US)

(73) Assignee: American AccuTech Ltd. Co., Sugar Land, TX (US)

( * ) Notice: Subject to any disclaimer, the term of this patent is extended or adjusted under 35 U.S.C. 154(b) by 235 days.

(21) Appl. No.: 13/468,106

(22) Filed: May 10, 2012

(65) Prior Publication Data

US 2012/0216720 A1 Aug. 30, 2012

Related U.S. Application Data

(63) Continuation-in-part of application No. 12/536,572, filed on Aug. 6, 2009, now abandoned.

(51) Int. Cl.

| | |
|---|---|
| C04B 22/12 | (2006.01) |
| C04B 28/02 | (2006.01) |
| C09K 17/02 | (2006.01) |
| C09K 17/10 | (2006.01) |
| E02D 3/11 | (2006.01) |
| C04B 111/00 | (2006.01) |
| C04B 111/32 | (2006.01) |

(52) U.S. Cl.
CPC .............. *C04B 22/126* (2013.01); *C04B 28/02* (2013.01); *C04B 2111/00732* (2013.01); *C04B 2111/0075* (2013.01); *C04B 2111/32* (2013.01); *C09K 17/02* (2013.01); *C09K 17/10* (2013.01); *E02D 3/11* (2013.01)

(58) Field of Classification Search
USPC .......... 405/229, 256, 263, 267; 106/638, 692, 106/694, 713, 815
See application file for complete search history.

(56) References Cited

U.S. PATENT DOCUMENTS

| | | | |
|---|---|---|---|
| 3,628,973 A * | 12/1971 | Greening et al. ............. 106/734 |
| 4,567,708 A * | 2/1986 | Haekkinen ................. 52/742.13 |
| 4,723,389 A * | 2/1988 | Kousek et al. ................ 52/698 |
| 4,992,103 A | 2/1991 | Smart | |
| 5,004,505 A * | 4/1991 | Alley et al. .................... 106/685 |
| 5,122,012 A | 6/1992 | Walker, Jr. | |
| 5,277,519 A * | 1/1994 | Nahm ......................... 405/129.3 |
| 5,855,666 A * | 1/1999 | Kao et al. ...................... 106/718 |
| 6,540,826 B2 | 4/2003 | Sommer et al. | |
| 6,818,057 B2 | 11/2004 | Hanley et al. | |
| 7,448,450 B2 * | 11/2008 | Luke et al. ..................... 166/293 |
| 2004/0188092 A1 * | 9/2004 | Santra et al. .................. 166/291 |
| 2006/0108150 A1 * | 5/2006 | Luke et al. ....................... 175/64 |

FOREIGN PATENT DOCUMENTS

| | | |
|---|---|---|
| CN | 1239085 A | 12/1999 |
| CN | 1067663 C | 6/2001 |
| EP | 991611 A1 | 4/2000 |
| FR | 2777883 A1 | 10/1999 |
| JP | 2001130932 A | 5/2001 |
| JP | 2006045060 A | 2/2006 |
| WO | WO 9955641 A1 | 11/1999 |

OTHER PUBLICATIONS

Michaels, Alan S. and Tausch, F. W., "Effects of fluorides, waterproofing agents, and polyphosphoric acid on soil stabilization with acidic phosphorus compounds," National Academy of Sciences—National Research Council, Highway Research Board Bulletin, No. 318, 1962, pp. 57-63.

Texas Department of Transportation (TxDOT), Guidelines for Treatment of Sulfate-Rich Soils and Bases in Pavement Structures, Technical Advisory, Sep. 2005.

* cited by examiner

*Primary Examiner* — Tara M. Pinnock
(74) *Attorney, Agent, or Firm* — Taboada Law Firm, PLLC; John M. Taboada (57) ABSTRACT

Methods for preventing, reducing, or eliminating construction heave, expansion, distresses, and damage primarily caused by the formation of ettringite are disclosed including introducing fluoride ion releasing agent/salt(s), such as sodium fluoride, calcium fluoride, and potassium fluoride, to expansive soil layers or concrete structural elements and allowing the fluoride ion releasing agent/salt(s) at ambient temperature to react with formed ettringite and to prevent the formation of ettringite of the expansive soil layers or concrete structural elements. Other embodiments are described and claimed.

5 Claims, 9 Drawing Sheets

EFFECTIVE APPROACH TO PREVENTING AND REMEDYING DISTRESSES IN SOILS AND CONSTRUCTION MATERIALS

RELATED U.S. PATENT AND APPLICATION DATA

The present application is a Continuation-In-Part of and claims priority of U.S. patent application Ser. No. 12/536,572, filed Aug. 6, 2009, the content of which is hereby incorporated by reference in its entirety.

BACKGROUND OF THE INVENTION

1. Field of the Invention

The present invention relates to chemical treatment of soils and construction materials for the construction of foundation or other concrete structures, and paved or unpaved surface to prevent or remedy distresses/damage of infrastructures due to the formation of ettringite or similar minerals.

2. Description of the Related Art

Existing expansive soils in the construction sites are always the concerns for the stability of the subgrade, base, and subbase, causing the distress and damage of foundations, paved or unpaved road surfaces and airport runways, etc. The formation of undesirable ettringite [$Ca_6Al_2(SO_4)_3(OH)_{12}$-$26H_2O$, Hydrated Calcium Aluminum Sulfate Hydroxide] or similar minerals is known to cause distresses and failures in natural and construction materials, such as examples above and in concrete structures. Phenomenon like heave in lime-stabilized sulfate-rich soils is well known to be due to the formation of ettringite, in which process a large amount of water is combined in the crystal lattice resulting in local expansion. One important mechanism of sulfate attack to portland cement concrete is also the formation of expansive ettringite.

The use of lime as soil stabilizer has been very popular in construction practice. To deal with the distresses associated with ettringite formation or similar minerals in lime-stabilized soils, two general approaches are used in current practice. The first approach is to cut or limit the supply of water, sulfate and/or aluminum in the soil. The second approach is to allow a mellowing period in which ettringite is allowed to form for a period of from 24 hours to several days, followed by the compaction in soil stabilization.

The first approach is often used in stabilizing expansive soil with moderate sulfate content. A few examples are given below. Polymer stabilizers, as an example, are purposed to coat individual soil particles and thus cut the supply of water. The depletion of available water is aimed to prevent the formation of ettringite or similar minerals. The use of gypsum, blast furnace slag, and portland type cement is another example of solidifying high plasticity soils. More recently, soil stabilization uses fly ash and ground granulated blast furnace slag (GGBFS) to change the Al/Si ratio and thus reduce the stability field of ettringite. The direct use of lime is known to cause more swelling than the original soil if the sulfate concentration is more than 3000 ppm (TxDOT 2005).

The second approach is used when the sulfate content of soil is between 3000 and 8000 ppm. Soil is mixed with lime and water first. The mixture is left alone for a period of from 24 hours to several days and then compacted. It is assumed that during the mellowing process most ettringite or similar minerals will form and its expansion will, therefore, not affect the soil compacted later. This approach of waiting is, however, costly for construction, and not applicable to soil with sulfate content larger than 8000 ppm.

When soil has the sulfate content larger than 8000 ppm, the use of lime is known to cause more expansion than without it. In this case, current practice forbids the use of lime to stabilize expansive soil (TxDOT 2005).

Polymer and acid stabilizers are, however, not found effective in obtaining long-term stabilization. The use of GGBFS with lime is reported relatively effective. However, the disadvantage of the use of GGBFS is its dosage, up to 5% of soil. GGBFS is a byproduct of steel plants and it is not easily accessible for many construction sites. Furthermore, the use of GGBFS is competing with the concrete industry for the limited resources.

In addition, there is currently no existing effective remedying measure for soils and concrete structures affected by sulfate attack or delayed ettringite formation (DEF). A possible method to deal with this distress is to improve the impermeability of soils and engineering structures by sealing them. However, as water molecules in ettringite are in a crystalline form, the reduction of relative humidity by sealing will not be able to remove them from the crystals of ettringite and similar minerals. As such, the sealing approach used for alkali-silica reaction (ASR) does not apply to DEF. However, in this invention, a different but effective approach is developed, as the remedying/retrofitting method, which is converting ettringite or similar hydrated minerals to crystals with less/or no water molecules in the crystal unit and thus reducing the volume.

It was reported that sodium fluosilicate as a secondary additive can accelerate strength development of clayey silt that is stabilized by polyphosphoric acid and other acidic phosphorus compounds (Michaels and Tausch 1962). New setting and hardening accelerator for hydraulic binders has been patented recently, as described in U.S. Pat. No. 6,540,826, where water-soluble fluoride comprising aluminum salts were used to prevent the later formation of ettringite so that acceleration of setting and hydration of hydraulic binders can be achieved. Another approach to decrease the tendency of soils to form ettringite is the application of barium containing compound to react with sulfate in soil, as described in U.S. Pat. No. 5,122,012. U.S. Pat. No. 6,818,057 describes ettringite formation retarder containing at least one of phosphono alkyl carboxylic acid and a salt of a phosphono alkyl carboxylic acid in hydrated calcium sulfoaluminate cements, while U.S. Pat. No. 4,992,103 described cementitious compositions that gain high compressive strength.

The conventional lime stabilization has long been proven an effective practice to improve soil properties. This invention can extend the application of lime to high sulfate soils. We describe a method of preventing, eliminating, or reducing the undesirable heave/distresses of sulfate-rich construction soil layers and expanding/cracking of concrete construction materials, with applications to new construction sites and to sites where remedying/retrofitting existing or potential distresses in subgrade, base, subbase, or construction materials is needed.

BRIEF SUMMARY OF THE INVENTION

The primary object of the present invention is to provide an effective and efficient method to prevent the undesirable heave/expansion/distresses of sulfate-rich construction soil layers and inorganic cementitious materials such as portland cement concrete caused by the formation of ettringite and similar hydrated minerals, through introducing fluoride ion ($F^-$) releasing compounds/materials, such as sodium fluoride, into new or existing construction materials. For instance, the method can be used in stabilizing sulfate-rich soils used as subgrade, base, subbase, and others, accompanied with the use of lime or during processing cement/concrete paste. By the present invention, no or minimum mellowing period is required after mixing the designed amount of the fluoride compound, such as sodium fluoride, with the soil, especially clayey soil of practically all range of aluminum and sulfate contents, in addition to other stabilizers, such as lime, etc. This can be applied to new construction sites to stabilize expansive soil. By the present invention, fluoride ion ($F^-$) releasing compounds can be introduced into fresh hydraulic binder mixes to prevent formation of ettringite or similar minerals so that the risks of internal and external sulfate attack are reduced.

As an extension of above applications in the new construction site, one can also, for the construction without using lime in soil stabilization, use designed amount of fluoride ion ($F^-$) releasing agent, such as sodium fluoride, to treat the expansive soil, to enhance stabilization of soils as subgrade, base, and subbase.

Another object of the present invention is to provide an effective and efficient method to eliminate or reduce the existing or potential heave/distresses of sulfate-rich construction soil layers and portland cement concrete structures caused by formation of ettringite or similar minerals, through introducing designed amount of fluoride ion ($F^-$) releasing agent/salts, such as sodium fluoride, during remedying/retrofitting the concerned materials by converting ettringite or similar minerals to new crystal phases, for instance, cryolite. These include, but not limited to, retrofitting/remedying undesirable heave/distresses of roadways, airport runways, building foundations, or the like whose base or subbase is lifted up by the formation of ettringite or similar minerals. This can be applied to the damaged sites of the existing constructions that need repair. Using the fluoride ion ($F^-$) releasing agent can be applied to soil layers with or without lime treatment or to concrete structures to eliminate or relieve the existing or potential heave/distresses.

In one respect, disclosed is a method of stabilizing expansive soil at ambient temperatures, the method comprising: adding a fluoride ion releasing agent to the expansive soil at ambient temperature to stabilize the expansive soil by preventing formation of ettringite; where adding the fluoride ion releasing agent to the expansive soil at ambient temperature comprises at least one of: mixing and reacting the fluoride ion releasing agent with the expansive soil, mixing the fluoride ion releasing agent with a stabilizing material, wherein the stabilizing material comprises at least one of: lime, portland cement, ground granulated blast furnace slag, and coal fly ash, and then mixing and reacting the fluoride ion releasing agent with the stabilizing material with the expansive soil, mixing the fluoride ion releasing agent into an aqueous solution and spraying the aqueous solution onto the soil and then mixing and reacting the aqueous fluoride ion releasing agent solution with the expansive soil, and mixing the fluoride ion releasing agent into the aqueous solution and spraying the aqueous solution onto the stabilizing material and then mixing and reacting the aqueous fluoride ion releasing agent solution with the stabilizing material with the expansive soil.

In another respect, disclosed is a method of preventing formation of ettringite at ambient temperature in a new concrete structure, the method comprising: adding a fluoride ion releasing agent to inorganic cementitious materials during processing at ambient temperature to prevent the formation of ettringite in the new concrete structures; where adding the fluoride ion releasing agent to the inorganic cementitious materials during processing at ambient temperature comprises at least one of: mixing and reacting the fluoride ion releasing agent with the inorganic cementitious materials, and mixing the fluoride ion releasing agent into an aqueous solution and then mixing and reacting the aqueous fluoride ion releasing agent solution with the inorganic cementitious materials.

In another respect, disclosed is a method of relieving or eliminating existing or potential ettringite-caused distress or damage of stabilized soils, subgrade, base, or subbase, the method comprising: introducing and reacting a fluoride ion releasing agent into the stabilized soils, subgrade, base, or subbase at ambient temperature to reduce occupied space of formed ettringite.

In yet another respect, disclosed is a method of relieving or eliminating existing or potential ettringite-caused distress or damage of a concrete structure, the method comprising: introducing and reacting a fluoride ion releasing agent into the concrete structure at ambient temperature to reduce occupied space of formed ettringite.

In yet another respect, disclosed is a method of remedying the movement and/or slope/tilting of a building foundation caused by formation of ettringite in the soil underneath the building foundation, the method comprising: introducing and reacting a fluoride ion releasing agent into the soil underneath the building foundation in order to react with formed ettringite to convert the formed ettringite to a mineral of smaller unit volume than the formed ettringite.

Numerous additional embodiments are also possible.

BRIEF DESCRIPTION OF THE DRAWINGS

Other objects and advantages of the invention may become apparent upon reading the detailed description and upon reference to the accompanying drawings.

FIG. 2 is a demonstration of the applications of the present invention. The fact that Treatment B had a larger volume than Treatment A confirmed the problem of lime stabilization of high sulfate soil. The volumes of Treatments C, D, and E show that with adequate fluoride ($F^-$) contents, soil can be effectively stabilized and strengthened.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

DETAILED DESCRIPTIONS OF THE PREFERRED EMBODIMENTS

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

This invention relates to preventing and relieving/eliminating the distresses of infrastructure systems, more particularly subgrade, base, and subbase for roadways, airport runways, building foundations, concrete structural members, or the like, which are caused by the formation of ettringite and/or similar minerals.

This invention includes the use of fluoride ion releasing agent/salts to react with free and bonded or bound aluminum in soils or construction materials, e.g., clayey soil, or portland cement, etc., to form minerals with less space volume, such as cryolite, rather than ettringite. Ettringite is known to cause undesirable expansion because of its large amount of water contained in the crystal. A typical example of chemical reactions used in this invention is but not limited to: sodium ions+aluminum ions+fluoride ions→cryolite (solid phase) [$3Na^+ + Al^{3+} + 6F^- \rightarrow Na_3AlF_6$ (solid phase)]. The use of fluoride ion releasing agent/salts can prevent the formation of ettringite or convert ettringite to cryolite or other fluoride minerals, fully or partially, with smaller solid volume.

Figure 1:
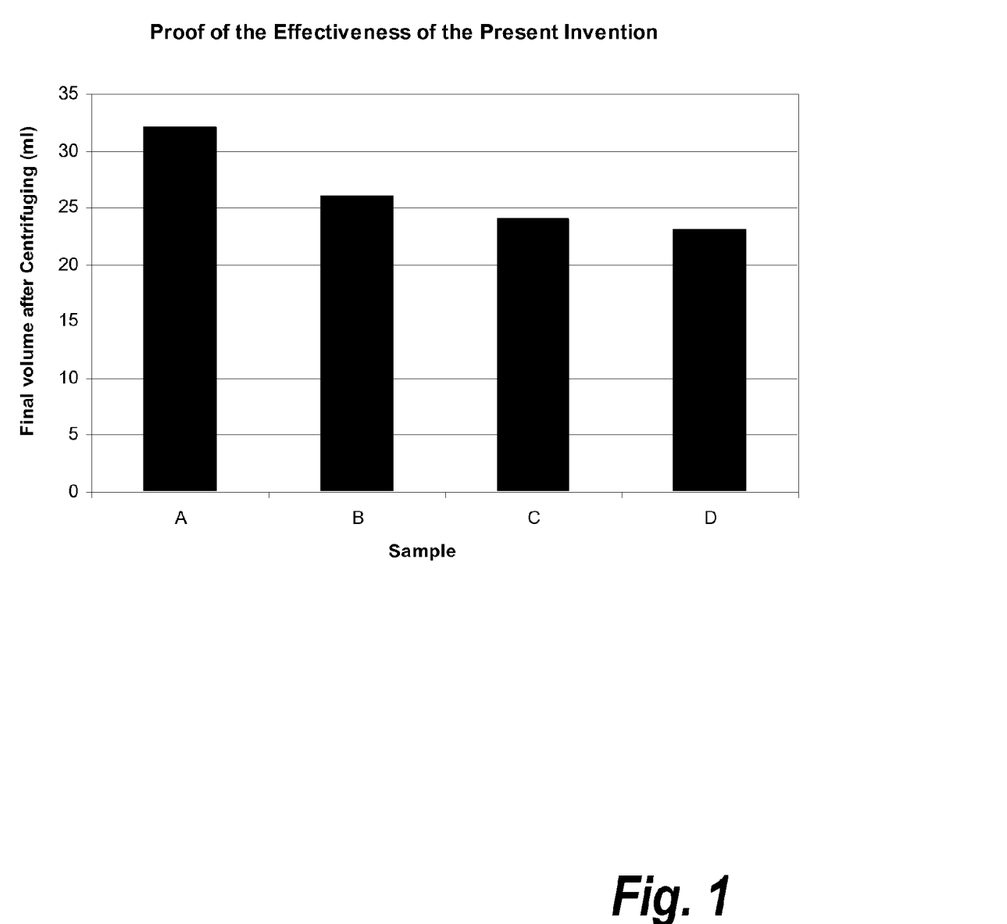
FIG. 1 is a chart showing proof of the proposed methods in which ettringite is prevented from being formed or ettringite is converted to cryolite or other minerals that bear smaller volume of the solid phase. Sample A as a control sample demonstrates formation of ettringite without sodium fluoride added. Sample B demonstrates that ettringite is converted to cryolite, the volume of solid phase reduced from control Sample A. Comparing to Sample A, Samples C and D demonstrate ettringite is prevented from being formed.

FIG. 1 is a chart showing proof of the proposed methods in which ettringite is prevented from being formed or ettringite is converted to cryolite or other minerals that bear smaller volume of the solid phase. Final volumes of the solid phase were measured after 4 hours centrifuging at 12,500 rpm at ambient temperature. Sample A: 61% soil, 15% aluminum sulfate $Al_2(SO_4)_3$, and 24% lime by weight. Total solid weight is 24 grams and water is added as required. Sample A demonstrates formation of ettringite without fluoride ion releasing materials added. Sample B: 61% soil, 15% aluminum sulfate, and 24% lime by weight. Total solid weight is 24 grams and water is added as required. 5.5 grams of sodium fluoride (NaF) in solution is added 7 days later. Sample B demonstrates that ettringite is converted to cryolite, the volume of solid phase reduced from control Sample A. Sample C: 61% soil, 15% aluminum sulfate, and 24% lime by weight. 5.5 grams sodium fluoride is also added and the total solid weight is 29.5 grams and water is added as required. Sample D: 61% soil, 15% aluminum sulfate and 24% lime by weight. Total solid weight is 24 grams and 5.5 grams sodium fluoride added in the soaking water. Comparing to Sample A, Samples C and D demonstrate ettringite is prevented from being formed.

Sample A in FIG. 1 is a control specimen where ettringite is formed. Samples C and D demonstrate the use of fluoride ion releasing compound, sodium fluoride, as a solid additive and liquid soaking solution, respectively, can prevent the formation of ettringite. This is proved by the reduced centrifuged solid volume of Samples C and D compared with Sample A, as shown in FIG. 1.

Ettringite can be converted to cryolite or similar minerals when in contact and reacting with sodium fluoride solution at ambient temperature in our experiment. Cryolite bears no water in its crystal structure and thus the conversion from ettringite to cryolite is a volume-reducing process, as shown in FIG. 1 by comparing Sample B with Sample A. When sodium fluoride solution is added to the duplicated sample of the control specimen Sample A that was left alone over seven days, there is a reduction of the volume, as shown in Sample B, of about 19%, compared with Sample A without the addition of sodium fluoride solution.

Figure 2:
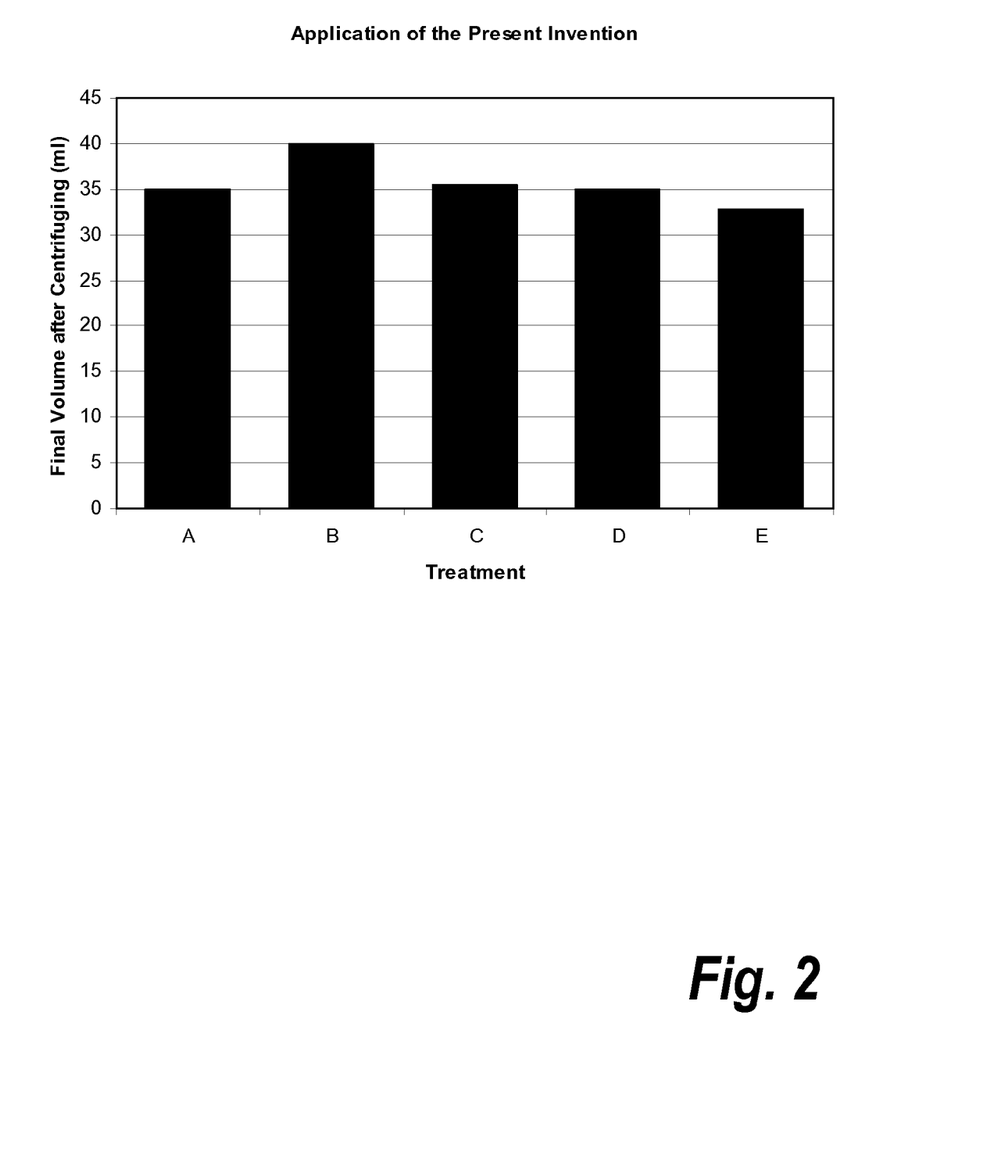

FIG. 2 is a demonstration of the applications of the present invention. Volumes of the solid phase were measured after samples were left alone at ambient temperature for seven days then centrifuged for 4 hours at 12,500 rpm at ambient temperature. Treatment A: 40 grams soil with no additive, soaked in 3.5% sodium sulfate ($Na_2SO_4$) solution. Treatment B: 40 grams soil and 2 grams lime, soaked in 3.5% sodium sulfate solution. Treatment C: 40 grams soil, 2 grams lime and 0.05 gram sodium fluoride (NaF), soaked in 3.5% sodium sulfate solution. Treatment D: 40 grams soil, 2 grams lime and 0.1 gram sodium fluoride, soaked in 3.5% sodium sulfate solution. Treatment E: 40 grams soil, 2 grams lime, 0.2 gram sodium fluoride, soaked in 3.5% sodium sulfate solution. The fact that Treatment B had a larger volume than Treatment A confirmed the problem of lime stabilization of high sulfate soil. The volumes of Treatments C, D, and E show that with adequate fluoride ($F^-$) contents, soil can be effectively stabilized and strengthened.

Some current construction practices involve the use of lime to stabilize expansive soils as subgrade, base, and/or subbase. The use of lime, however, is not very effective when sulfate content of soil is higher than 3000 ppm. It is demonstrated in the present invention, the addition of fluoride ion releasing agent/salts in the designed amount, which are mixed with the concerned soils, either in aqueous phase or in the solid phase followed by conventional practice steps, can reduce the free aluminum in soil by forming cryolite thus preventing the formation of ettringite and/or similar minerals. As a result, lime can be used effectively and efficiently to soils with all range of sulfate and aluminum contents. No or minimum mellowing is needed and the construction process is therefore expedited.

Conversion of ettringite to minerals of smaller unit volume, such as cryolite, can relieve, reduce, or eliminate the undesirable heave or distresses to remedy/retrofit subgrade, base, and subbase materials and concrete structures for existing or potential heave/damage of surface or foundation movement/slope caused by the ettringite formation. The designed amount of the fluoride agent, such as sodium fluoride, can be introduced in liquid phase to the ettringite-forming sites in soils or concrete structures through designed pattern of injection ports (holes) and depth with predetermined concentration, and this process is then followed by conventional or specifically designed post treatment procedures.

The amount of the fluoride ion releasing agent/salts needed in soil stabilization is related to the free aluminum contents in the soil and should be tested and adjusted for each specific soil. For the soil used in this invention, dosages of sodium fluoride as 2.5%, 5%, and 10% of lime are used in the tests. A dose of 10% of lime is adequate to stabilize the soil used in the experiment, as shown in FIG. 2.

Figure 3:
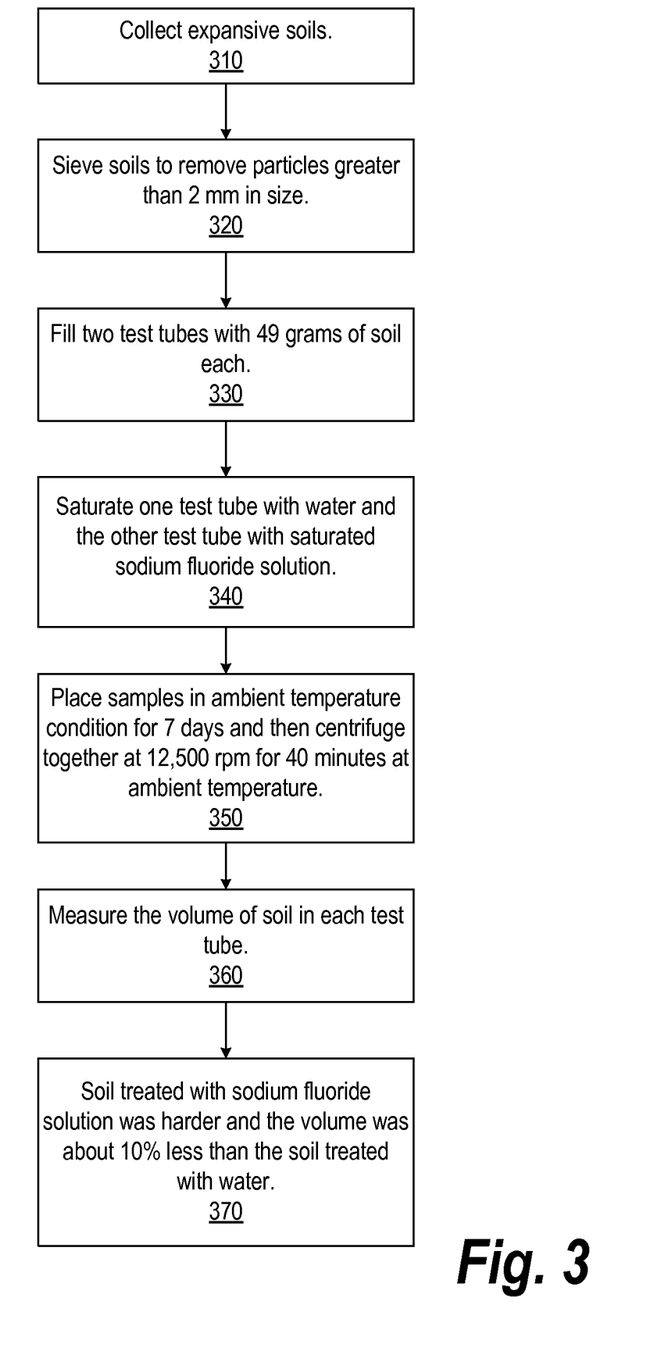
FIG. 3 is a block diagram showing treating expansive soil only for stabilization.

FIG. 3 is a block diagram showing treating expansive soil only for stabilization.

Expansive soils collected from the location of west of U.S. Highway 290 at Highway 183 were used in the test 310. The soils were sieved to remove particles of size greater than 2 mm 320. The soils were weighed to form two samples of 49 grams each and filled in two test tubes, respectively 330. In the dry condition, the volumes of the soils in two tubes were very close, if not same. One tube was filled with water and the other with saturated sodium fluoride solution, and the soils were 100% saturated, with exceeded water and sodium fluoride solution on top of soils in two test tubes, respectively 340. The samples were placed in the ambient temperature condition for 7 days, and then centrifuged together at 12,500 rpm for 40 minutes 350 at ambient temperature and then the volumes of soils in the two tubes were measured 360. It was found the soil treated with sodium fluoride solution was harder and the volume was about 10% less than the soil treated with water 370. This result is similar to that shown in Sample B versus Sample A of FIG. 1.

Figure 4:
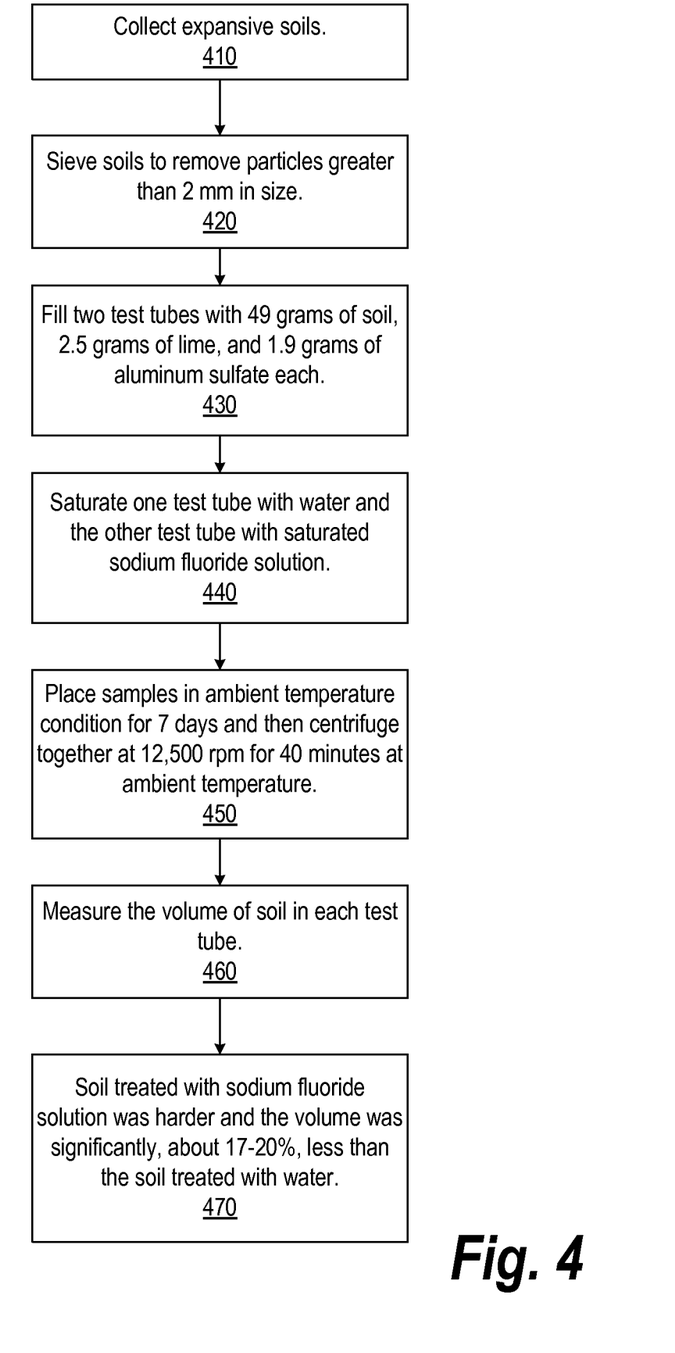
FIG. 4 is a block diagram showing treating lime-stabilized expansive soil using sodium fluoride solution.

FIG. 4 is a block diagram showing treating lime-stabilized expansive soil using sodium fluoride solution.

Expansive soils collected from the location of west of U.S. Highway 290 at Highway 183 were used in the test 410. The soils were sieved to remove particles of size greater than 2 mm 420. The soils were weighed to form two samples of 49 grams each. Each sample was mixed with 2.5 grams of lime and 1.9 grams of aluminum sulfate and filled in each test tube 430. In the dry condition, the volumes of the solid materials in two tubes were very close, if not same. One tube (Sample "SWOF") was filled with water and the other (Sample "SWF") was filled with saturated sodium fluoride solution. The soils in both tubes were 100% saturated, with excessive water and sodium fluoride solution on top of soils in two test tubes, respectively 440. The samples were placed in the ambient temperature conditions for 7 days, and then centrifuged together at 12,500 rpm for 40 minutes 450 at ambient temperature and then the volumes of soils in two tubes were measured 460. It was found the soil treated with sodium fluoride solution (Sample "SWF") was harder and the volume was significantly (about 17% to 20%) less than the soils treated with water (Sample "SWOF") 470. This result is similar to that shown in Sample D versus Sample A of FIG. 1.

Figure 5:
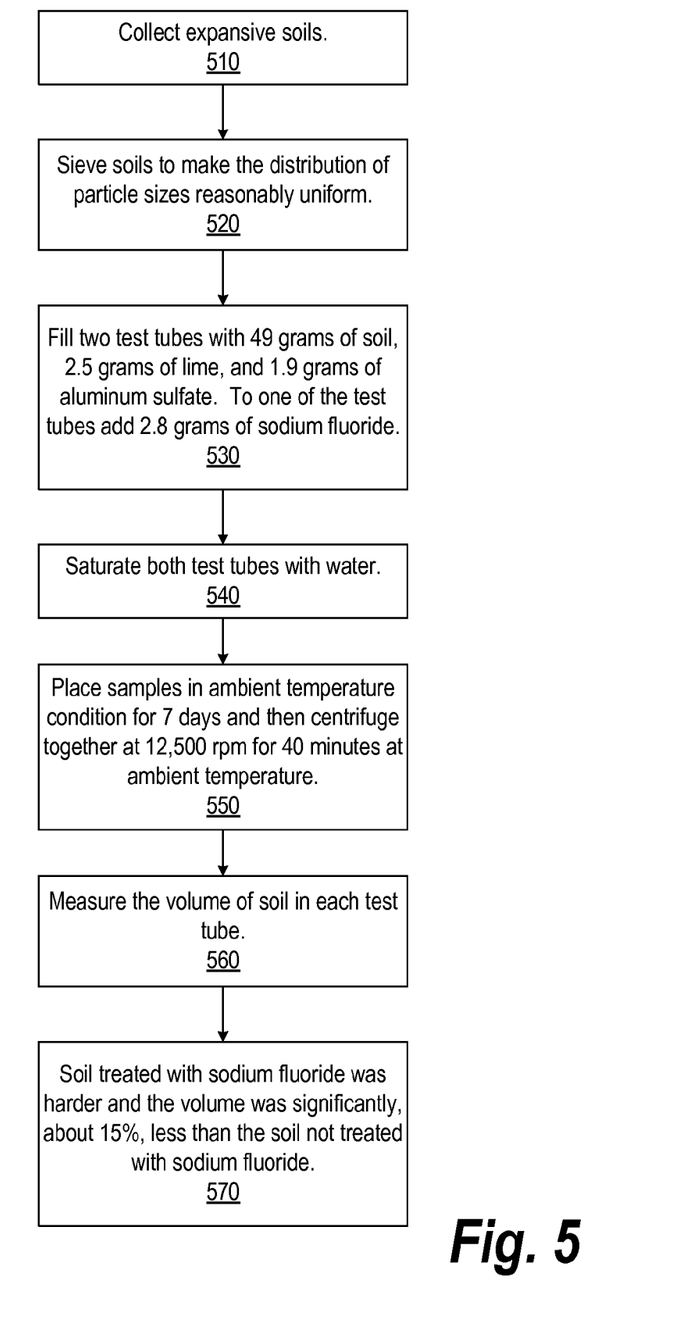
FIG. 5 is a block diagram showing treating lime-stabilized expansive soil using solid sodium fluoride.

FIG. 5 is a block diagram showing treating lime-stabilized expansive soil using solid sodium fluoride.

Expansive soils collected from the location of west of U.S. Highway 290 at Highway 183 were used in the test 510. The soils were sieved to make the distribution of particle sizes reasonably uniform 520. The soils were weighed to form two samples of 49 grams each. One sample (Sample "SLWF") was mixed with 2.5 grams of lime, 1.9 grams of aluminum sulfate and 2.8 grams of sodium fluoride and the other sample (Sample "SLWOF") was mixed with 2.5 grams of lime and 1.9 grams of aluminum sulfate only. Two samples were filled in two test tubes, respectively 530. Both tubes were filled with water 540. The soils in both tubes were 100% saturated, with exceeded water on top of soils. The samples were placed in ambient room temperature conditions for 7 days, and then centrifuged together at 12,500 rpm for 40 minutes 550 at ambient temperature and then the volumes of soils in two tubes were measured 560. It was found the soil treated with sodium fluoride (Sample "SLWF") was harder and the volume was significantly (about 15%) less than the soil without being treated with sodium fluoride (Sample "SLWOF") 570. This result is similar to that shown in Sample C versus Sample A of FIG. 1.

Figure 6:
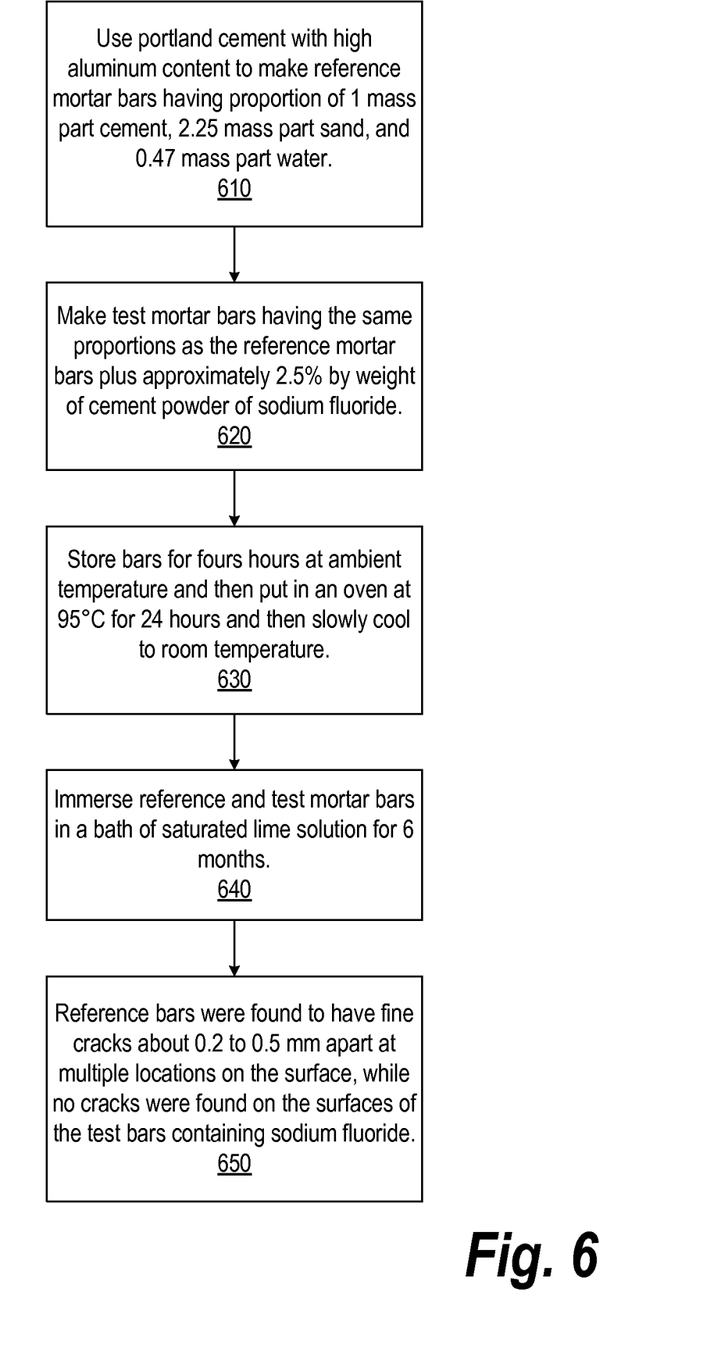
FIG. 6 is a block diagram showing preventing ettringite-forming-type damage of precast concrete structure.

FIG. 6 is a block diagram showing preventing ettringite-forming-type damage of precast concrete structure.

Portland cement with high aluminum content was used to make mortar bars of a size of 1×1×12 inch. Reference mix has a proportion of 1 mass part cement, 2.25 mass part sand, and 0.47 mass part water (Sample "CWOF") 610. The test mix was mixed at ambient temperature with the same proportions except for the addition of sodium fluoride of approximate 2.5% (weight) of cement powder (Sample "CWF") 620. After specimen preparation, the specimens were first stored in the ambient temperature condition for four hours and then put in an oven with a temperature set at 95° C. Twenty-four hours later, the specimens were slowly cooled to the room temperature 630 and removed from the molds. Mortar bars identified as "CWOF" and "CWF" were immersed in a bath of saturated lime solution for 6 months 640. Bars identified as "CWOF" were found to have fine cracks about 0.2 to 0.5 mm apart at multiple locations on the surfaces, while no cracks were found on the surfaces of specimens identified as "CWF" 650. This proves that added fluoride ions prevent delayed ettringite formation in new concrete structures where corrosion of reinforcement is not a concern.

Figure 7:
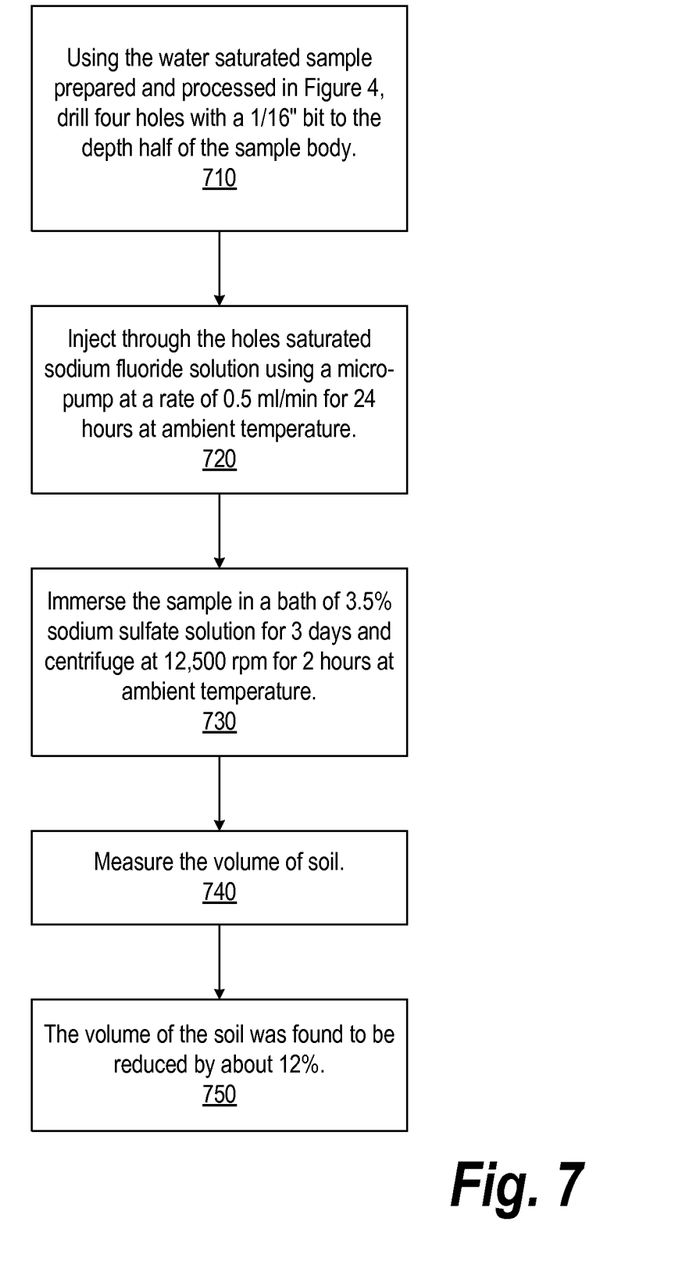
FIG. 7 is a block diagram showing eliminating/relieving ettringite-caused expansion in soils.

FIG. 7 is a block diagram showing eliminating/relieving ettringite-caused expansion in soils.

The sample "SWOF" in FIG. 4 was used in this experiment. The body of the stabilized soil "SWOF" was drilled four holes using a 1/16" bit to the depth half of the sample body 710. Saturated sodium fluoride solution was injected through the holes to the soil body using pressure micro-pump at a rate of 0.5 ml/min for 24 hours 720 at ambient temperature. The sample in the tube was then immersed in a bath of 3.5% sodium sulfate solution for 3 days at ambient temperature. The tube was then centrifuged at 12,500 rpm for 2 hours 730 at ambient temperature and the volume of the soil was measured 740 and found reduced by about 12% 750.

Figure 8:
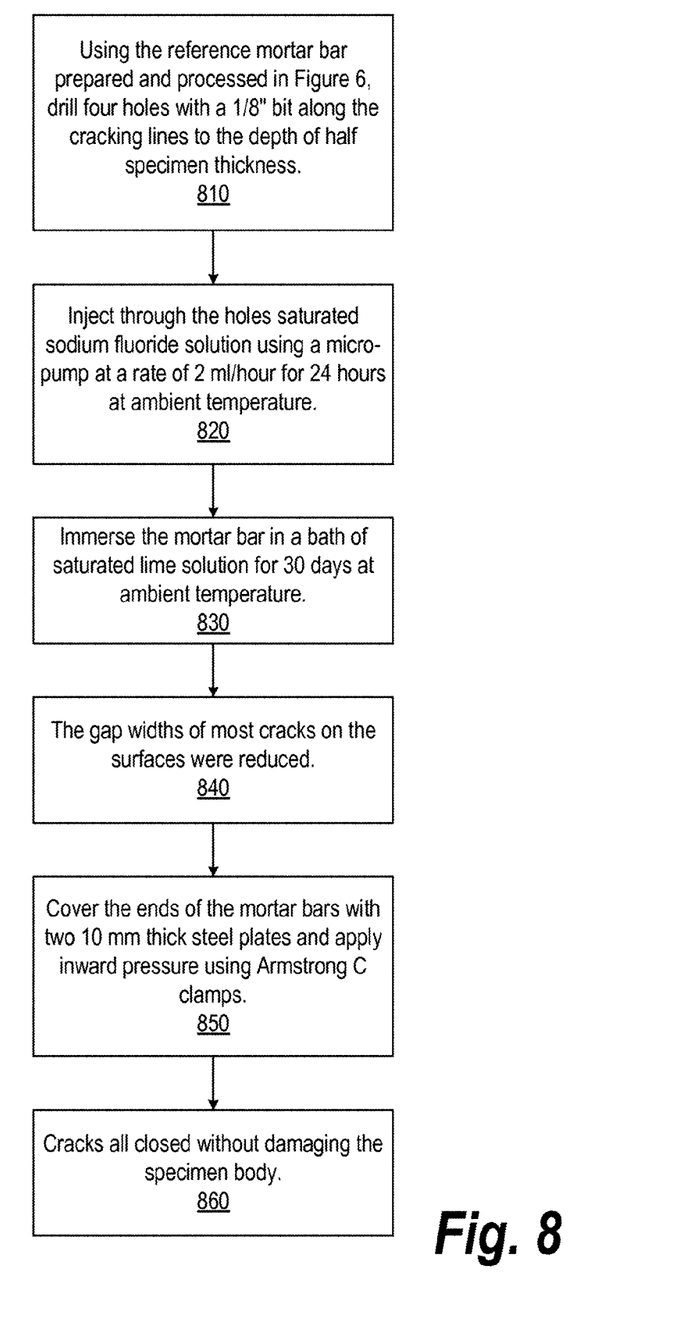
FIG. 8 is a block diagram showing eliminating/relieving concrete expansion/cracking caused by ettringite formation.

FIG. 8 is a block diagram showing eliminating/relieving concrete expansion/cracking caused by ettringite formation.

The specimen "CWOF" in FIG. 6 was further used in this experiment. The body of the mortar bar was drilled four holes using a 1/8" bit along the cracking lines to the depth of half specimen thickness 810. Saturated sodium fluoride solution was injected by a pressure micro-pump at a rate of 2 ml/hour for 24 hours 820 at ambient temperature. The mortar bar was then immersed in a bath of saturated lime solution for 30 days 830 at ambient temperature. It was found that the gap widths of most cracks on the surfaces were reduced 840. The ends of the mortar bar were then covered by two 10 mm thick steel plates and inward pressure was applied using a device similar to Armstrong C clamps 850. The cracks were all closed without damaging the specimen body 860.

Figure 9:
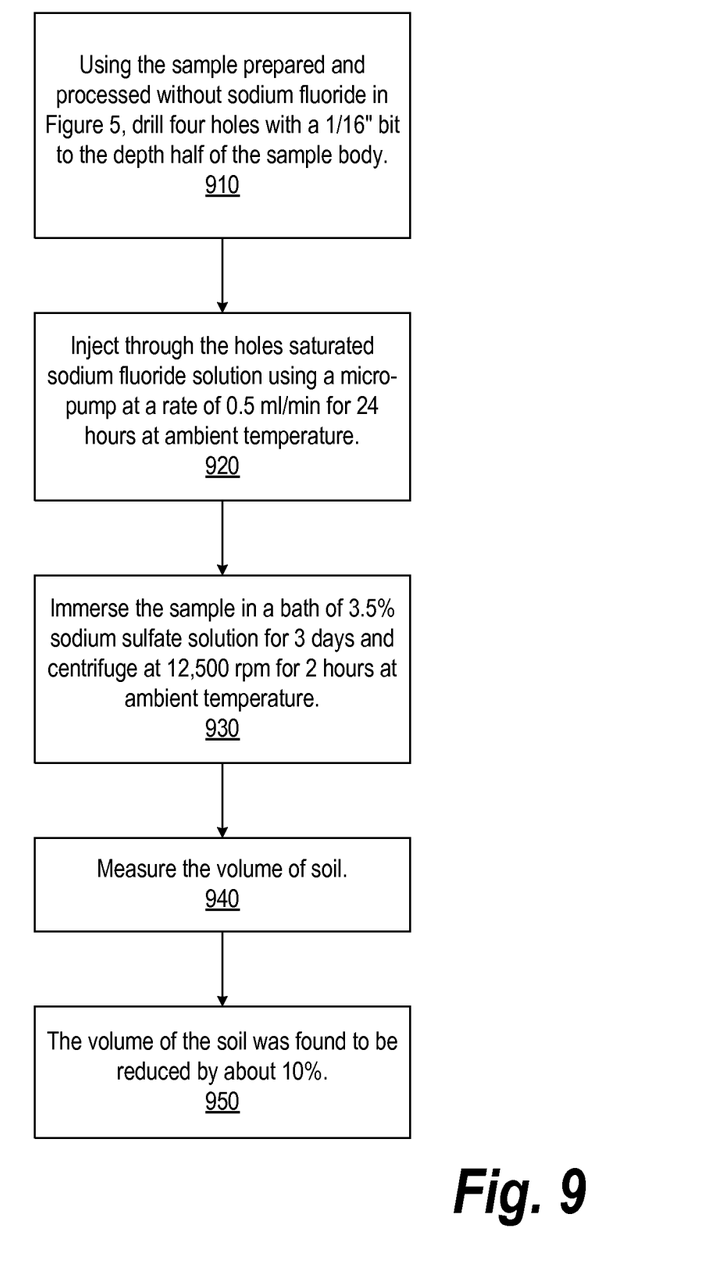
FIG. 9 is a block diagram showing eliminating/relieving ettringite-formation-type expansion in soils stabilized by lime.

FIG. 9 is a block diagram showing eliminating/relieving ettringite-formation-type expansion in soils stabilized by lime.

Sample "SLWOF" in FIG. 5 was further used in the experiment. The body of the stabilized soil "SLWOF" was drilled four holes using a 1/16" bit to the depth half of the sample body 910. Saturated sodium fluoride solution was injected through the holes to the soil body using a pressure micro-pump at a rate of 0.5 ml/min for 24 hours 920 at ambient temperature. The sample in the tube was then immersed in a bath of 3.5% sodium sulfate solution for 3 days at ambient temperature. The tube was centrifuged at 12,500 rpm for 2 hours 930 at ambient temperature and the volume of the soil was measured 940 and found the volume reduced by about 10% 950.

In some embodiments, a road is to be built over an area with expansive soils. The expansive soil has a thickness of 20 inches and a clay content of 27%. Clay is defined as soil particles having a size smaller than 2 microns. The expansive soil has a measured plasticity index with ASTM D4318 of 18 and a sulfate content of 0.25% ($SO_4$ by mass). Before the subbase, base, and pavement is placed on the expansive soil, a fluoride ion releasing agent, such as sodium fluoride, potassium fluoride, or calcium fluoride, or any combination thereof, will be spread onto the surface of the expansive soil. If the water content of the expansive soil is greater than or equal to 3%, the fluoride ion releasing agent will be applied in a dry powder form. If the water content of the expansive soil is less than 3%, the fluoride ion releasing agent will be applied in a water or aqueous solution. The amount of water is adjusted so that the water content of the treated expansive soil is about 3%. Alternatively, the fluoride ion releasing agent, either in a dry powder form or aqueous solution, may be mixed with a stabilizing material before being mixed with the expansive soil. The stabilizing material may comprise at least one of: lime, portland cement, ground granulated blast furnace slag, and coal fly ash. If the thickness of the expansive soil to be treated is greater than 12 inches, the expansive soil is treated by one or more layers of 6 to 12 inches in thickness. In this embodiment, the 20 inches of expansive soil is to be treated in two layers of 10 inches a piece. To begin treatment of the expansive soil, the top 10 inches of the expansive soil is first excavated and stored near the road to be constructed. Next, the fluoride ion releasing agent is uniformly applied at ambient temperature on the exposed expansive soil surface either manually or with a truck. Afterwards, a truck disturbs and uniformly mixes at ambient temperature the fluoride ion releasing agent throughout the remaining 10 inches of expansive soil. After approximately two hours, a roller truck compacts the expansive soil to a unit weight of 120 lb per cubic feet or higher. This may require more than one pass over the expansive soil. After approximately two hours, the initially excavated soil is uniformly spread out over the just treated 10 inches of expansive soil. Without having to wait anytime, the top 10 inches of expansive soil then undergoes the same processing as the bottom 10 inches of expansive soil starting with the uniform application of the fluoride ion releasing agent and ending with the compaction to 120 lb per cubic feet or higher with a roller truck. Construction of the subbase, base, and pavement can proceed after approximately 12 hours after final treatment of the expansive soil.

In some embodiments, a fluoride ion releasing agent is used to relieve or eliminate existing or potential ettringite caused distress or damage of stabilized soils, subgrade, base, or subbase. A fluoride ion releasing agent is introduced into the stabilized soils, subgrade, base, or subbase at ambient temperature by first drilling holes into the stabilized soils, subgrade, base, or subbase. Next, the holes are filled with the fluoride ion releasing agent either in an aqueous solution or in a solid phase. If the fluoride ion releasing agent is used in a solid phase, then water is supplied to the holes to transport the fluoride ion releasing agent in solid phase into the stabilized soils, subgrade, base, or subbase. After waiting between approximately 12 to 24 hours to mitigate stress and/or distress, the holes are subsequently sealed.

In some embodiments, a fluoride ion releasing agent is used to repair ettringite affected concrete structural elements. Delayed ettringite formation in the concrete structural element may result in loss of concrete strength and corrosion of the steel rebar buried in the concrete structural elements. In some embodiments, cracks, having widths up to 0.5 inches and running about 30% of the length of a bridge column may result from delayed ettringite formation. To repair the damage with a fluoride ion releasing agent, infiltration holes with a 0.5 inch diameter are drilled along the length of the crack with a spacing of about 3 feet between infiltration holes. This step and all steps of the repair are done at ambient temperature. The depth of the holes should reach to the bottom of the crack. In this embodiment, the infiltration holes are 2 inches or higher. Stainless steel nozzles are then secured in the infiltration holes by a two-part epoxy. The bridge column is then wrapped from bottom to top with carbon-fiber reinforced plastics having a gross thickness of 0.5 mm, for at least three layers. The wrapping force has a minimum of 500 pounds per linear foot along the width on the sheet. The stainless steel nozzles are exposed through the carbon-fiber reinforced plastic wrap. Next, a fluoride ion releasing agent, such as a sodium fluoride or potassium fluoride solution, having a solution concentration of 1.0% is pumped through the stainless steel nozzles. During pumping, any leaks through the carbon-fiber reinforced plastic wrap are fixed. The fluoride ion releasing agent is pumped until the pumping pressure is maintained above 15 psi for more than 15 minutes. After this point is reached, pumping is stopped and the stainless steel nozzles are capped in order to keep the fluoride ion releasing agent in the bridge column. After approximately seven days, the fluoride ion releasing agent is again pumped through the stainless steel nozzles until the pumping pressure is maintained above 15 psi for more than 15 minutes. After this point is again reached, pumping is stopped and the stainless steel nozzles are capped in order to keep the fluoride ion releasing agent in the bridge column. This procedure of pumping the fluoride ion releasing agent is repeated for four weeks at approximately seven day intervals. During this time, the tension force of the carbon-fiber reinforced plastic is maintained at 500 pounds per linear foot along the width on the sheet.

In some embodiments, a fluoride ion releasing agent is used to prevent formation of ettringite at ambient temperature in new concrete structures, such as foundations, precast girders, or piers. A fluoride ion releasing agent, either in solid form or aqueous solution, is introduced into and reacted with the inorganic cementitious materials, such as portland cement and/or calcium aluminum cement, at ambient temperature during processing to prevent the ettringite formation. The fluoride ion releasing agent may comprise at least one of: sodium fluoride, calcium fluoride, and potassium fluoride.

In some embodiments, a fluoride ion releasing agent is used to relieve or eliminate existing or potential ettringite-caused distress or damage of a concrete structure, such as a foundation, a precast girder, or a pier. A fluoride ion releasing agent is introduced into the concrete structure at ambient temperature by first drilling holes into the concrete structure. Next, the holes are injected and/or pumped with the fluoride ion releasing agent either in an aqueous solution or in a solid phase. If the fluoride ion releasing agent is used in a solid phase, then water is supplied to the holes to transport the fluoride ion releasing agent in solid phase into the concrete structure. After waiting between approximately 4 to 6 weeks to mitigate stress and/or distress, the holes are subsequently sealed.

In some embodiments, a fluoride ion releasing agent is used to remedy the movement and/or slope/tilting of a building foundation caused by formation of ettringite in the soil underneath the building foundation by converting the formed ettringite to a mineral of smaller unit volume than the formed ettringite. One such mineral is cryolite. A fluoride ion releasing agent is introduced into the soil underneath the building foundation by first drilling holes into the soil underneath the building foundation. Next, the holes are injected and/or pumped with the fluoride ion releasing agent either in an aqueous solution or in a solid phase. If the fluoride ion releasing agent is used in a solid phase, then water is supplied to the holes to transport the fluoride ion releasing agent in solid phase into the soil underneath and/or around the building foundation. After waiting between approximately 2 to 4 weeks to mitigate movement and/or slope/tilting, the holes are subsequently sealed.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method of relieving or eliminating existing or potential ettringite-caused distress or damage of stabilized soils, subgrade, base, or subbase, the method comprising: introducing and reacting a fluoride ion releasing agent into the stabilized soils, subgrade, base, or subbase at ambient temperature to reduce occupied space of formed ettringite, where introducing and reacting the fluoride ion releasing agent into the stabilized soils, subgrade, base, or subbase at ambient temperature comprises:
    a. drilling holes into the stabilized soils, subgrade, base, or subbase;
    b. filling the holes with the fluoride ion releasing agent in solid phase;
    c. supplying the holes with water to transport the fluoride ion releasing agent in solid phase into the stabilized soils, subgrade, base, or subbase;
    d. waiting between approximately 12 to 24 hours to mitigate stress and/or distress; and
    e. sealing the holes.

2. A method of relieving or eliminating existing or potential ettringite-caused distress or damage of a concrete structure, the method comprising: introducing and reacting a fluoride ion releasing agent into the concrete structure at ambient temperature to reduce occupied space of formed ettringite, where introducing and reacting the fluoride ion releasing agent into the concrete structures at ambient temperature comprises:
    a. drilling holes into the concrete structure;
    b. injecting and/or pumping the fluoride ion releasing agent in an aqueous solution into the holes;
    c. waiting between approximately 4 to 6 weeks to mitigate stress and/or distress; and
    d. sealing the holes.

3. A method of relieving or eliminating existing or potential ettringite-caused distress or damage of a concrete structure, the method comprising: introducing and reacting a fluoride ion releasing agent into the concrete structure at ambient temperature to reduce occupied space of formed ettringite, where introducing and reacting the fluoride ion releasing agent into the concrete structures at ambient temperature comprises:
    a. drilling holes into the concrete structure;
    b. filling the holes with the fluoride ion releasing agent in solid phase;
    c. supplying the holes with water to transport the fluoride ion releasing agent in solid phase into the concrete structure;
    d. waiting between approximately 4 to 6 weeks to mitigate stress and/or distress; and
    e. sealing the holes.

4. A method of remedying the movement and/or slope/tilting of a building foundation caused by formation of ettringite in the soil underneath the building foundation, the method comprising: introducing and reacting a fluoride ion releasing agent into the soil underneath the building foundation in order to react with formed ettringite to convert the formed ettringite to a mineral of smaller unit volume than the formed ettringite, where introducing and reacting the fluoride ion releasing agent into the soil underneath the building foundation comprises:
    a. drilling holes into the soil underneath and/or around the building foundation;
    b. injecting and/or pumping the fluoride ion releasing agent in an aqueous solution into the holes;
    c. waiting between approximately 2 to 4 weeks to mitigate movement and/or slope/tilting; and
    d. sealing the holes.

5. A method of remedying the movement and/or slope/tilting of a building foundation caused by formation of ettringite in the soil underneath the building foundation, the method comprising: introducing and reacting a fluoride ion releasing agent into the soil underneath the building foundation in order to react with formed ettringite to convert the formed ettringite to a mineral of smaller unit volume than the formed ettringite, where introducing and reacting the fluoride ion releasing agent into the soil underneath the building foundation comprises:
    a. drilling holes into the soil underneath and/or around the building foundation;
    b. filling the holes with the fluoride ion releasing agent in solid phase;
    c. supplying the holes with water to transport the fluoride ion releasing agent in solid phase into the soil underneath and/or around the building foundation;
    d. waiting between approximately 2 to 4 weeks to mitigate movement and/or slope/tilting; and
    e. sealing the holes.

* * * * *